US012771037B2

(12) United States Patent
Odes et al.

(10) Patent No.: US 12,771,037 B2
(45) Date of Patent: Oct. 20, 2026

(54) ON GLASS SHORTED MONOPOLE ANTENNA DESIGN

(71) Applicant: GM Global Technology Operations LLC, Detroit, MI (US)

(72) Inventors: Uriel Zvi Odes, Givaat Shmuel (IL); Nahel Eshaq, Rochester, MI (US); Duane S. Carper, Davison, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 8 days.

(21) Appl. No.: 18/675,873

(22) Filed: May 28, 2024

(65) Prior Publication Data

US 2025/0372877 A1 Dec. 4, 2025

(51) Int. Cl.

*H01Q 9/30* (2006.01)
*H01Q 1/12* (2006.01)
*H01Q 21/00* (2006.01)
*H01Q 21/06* (2006.01)

(52) U.S. Cl.

CPC ............ *H01Q 9/30* (2013.01); *H01Q 1/1278* (2013.01); *H01Q 21/0006* (2013.01); *H01Q 21/06* (2013.01)

(58) Field of Classification Search

CPC .... H01Q 9/30; H01Q 1/1278; H01Q 21/0006; H01Q 21/06

See application file for complete search history.

(56) References Cited

U.S. PATENT DOCUMENTS 5,012,255 A 4/1991 Becker
5,072,229 A * 12/1991 Hirasa .................. H01Q 1/1271 343/713
5,355,144 A * 10/1994 Walton ................... H01Q 13/16 343/769
5,589,839 A 12/1996 Lindenmeier et al.

(Continued)

FOREIGN PATENT DOCUMENTS

DE 102024120184 A1 * 12/2025 ........... H01Q 1/1278
JP S6352305 U 4/1988

(Continued)

OTHER PUBLICATIONS

German Office Action for German Application No. 102024120184.3; dated Apr. 1, 2025; 4 pages.

(Continued)

*Primary Examiner* — Dameon E Levi
*Assistant Examiner* — Jordan E. DeWitt
(74) *Attorney, Agent, or Firm* — CANTOR COLBURN LLP

(57) ABSTRACT

A vehicle includes a window having an antenna assembly. The window includes a glass surface, a metal frame around the glass surface, and a set of defroster wires in the glass surface. A top wire of the set of defroster wires is separated from a top edge of the metal frame by an antenna region. The antenna is disposed in the antenna region. The antenna has a first end and a second end opposite the first end. The first end intersects a horizontal cover line of the metal frame tangentially. A feed line connects to the first end at the horizontal cover line. A ground line electrically couples the second end of the antenna to the metal frame.

20 Claims, 10 Drawing Sheets

(56) References Cited

U.S. PATENT DOCUMENTS 5,650,791 A * 7/1997 Talty .................... H01Q 1/1271 343/744
5,898,407 A * 4/1999 Paulus ................. H01Q 1/1271 343/713
6,097,345 A 8/2000 Walton
6,111,552 A 8/2000 Gasser
6,396,445 B1 * 5/2002 Saitoh .................. H01Q 1/1278 343/704
6,417,811 B1 * 7/2002 Adrian ................. H01Q 1/1271 343/861
9,337,525 B2 5/2016 Dai
2004/0041735 A1 * 3/2004 Sugimoto ................ H01Q 9/16 343/700 MS
2004/0113848 A1 * 6/2004 Gaucher .................. H01Q 1/24 343/702
2004/0257286 A1 * 12/2004 Iijima ...................... H01Q 5/40 343/713
2005/0035913 A1 * 2/2005 Baranski ................ H01Q 13/16 343/713
2005/0057409 A1 * 3/2005 Choo ....................... H01Q 1/36 343/728
2005/0231432 A1 * 10/2005 Tsurume .................. H01Q 9/30 343/711
2006/0082504 A1 * 4/2006 Chen ........................ H01Q 9/40 343/702
2006/0152421 A1 7/2006 Baranski
2006/0181464 A1 * 8/2006 Erkocevic ................ H01Q 9/42 343/702
2006/0202898 A1 * 9/2006 Li ........................ H01Q 1/1271 343/713
2007/0024511 A1 * 2/2007 Li ........................ H01Q 9/0428 343/700 MS
2007/0246967 A1 * 10/2007 Lynam ................... B60J 5/0404 296/146.1
2008/0169989 A1 * 7/2008 Li .......................... H01Q 21/30 343/793
2012/0098715 A1 * 4/2012 Dai ...................... H01Q 1/1285 343/712
2012/0098716 A1 4/2012 Dai
2012/0154229 A1 6/2012 Kagaya et al.
2012/0256798 A1 10/2012 Paulus et al.
2013/0257663 A1 * 10/2013 Saito ...................... H01Q 5/371 343/712
2014/0060921 A1 * 3/2014 Reul ...................... H01Q 1/526 29/601
2015/0207203 A1 7/2015 Lee et al.
2015/0357700 A1 * 12/2015 Kagaya .................... H01Q 1/27 343/770
2015/0357705 A1 * 12/2015 Ito ........................ H01Q 1/3283 343/713
2016/0087327 A1 * 3/2016 Niihara ................ H01Q 1/1271 343/713
2016/0294037 A1 * 10/2016 Ochi ...................... H01Q 5/371
2017/0012344 A1 * 1/2017 Wu ........................ H01Q 1/243
2017/0033433 A1 * 2/2017 Winkelmann ....... H01Q 13/106
2017/0040662 A1 * 2/2017 Dai ........................ H01Q 5/371
2017/0186710 A1 * 6/2017 Yoon ...................... H10W 44/20
2017/0324141 A1 * 11/2017 Talty .................... H01Q 1/3291
2017/0346154 A1 11/2017 Kagaya
2018/0090821 A1 * 3/2018 Lee .......................... H01Q 9/42
2018/0138586 A1 5/2018 Takeuchi et al.
2018/0151939 A1 * 5/2018 Hashimoto .......... H01Q 1/1271
2018/0261921 A1 * 9/2018 Ha .......................... H01Q 9/42
2019/0115653 A1 * 4/2019 Yun ........................ H01Q 21/28
2019/0165447 A1 * 5/2019 Furlan .................. H01Q 1/1271
2019/0273302 A1 9/2019 Dai
2020/0162591 A1 * 5/2020 Jung ...................... H01Q 21/28
2020/0203807 A1 * 6/2020 Wu ........................ H01Q 23/00
2020/0251804 A1 * 8/2020 Takeuchi ............... H01Q 13/16
2021/0044003 A1 * 2/2021 Ma ......................... H01Q 13/10
2021/0175628 A1 * 6/2021 Dai ...................... H01Q 1/1285
2021/0234254 A1 7/2021 Dai
2021/0296766 A1 * 9/2021 Li ........................ H01Q 9/0421
2022/0006179 A1 * 1/2022 Miller .................. H01Q 1/3275
2022/0085501 A1 * 3/2022 Jian .......................... H01Q 5/35
2022/0311123 A1 * 9/2022 Mamuro .................. H01Q 9/16
2023/0009333 A1 * 1/2023 Yun ...................... H04B 7/0413
2023/0014394 A1 * 1/2023 Ilvonen .................... H01Q 9/42
2023/0045425 A1 * 2/2023 Yamamoto ........... H01Q 1/1271
2023/0113751 A1 * 4/2023 Fang ........................ H01Q 1/24 343/702
2023/0318170 A1 * 10/2023 Imamura .................. H01Q 5/40 343/713
2024/0088573 A1 * 3/2024 Sekiya ..................... H01Q 9/40
2024/0113425 A1 * 4/2024 Theofanopoulos .... H01Q 1/243
2024/0275020 A1 * 8/2024 Takeuchi ............ H01Q 1/1271
2025/0167423 A1 * 5/2025 Kim ....................... H01Q 5/371
2025/0167424 A1 * 5/2025 Lee ...................... H01Q 1/1271
2025/0246795 A1 * 7/2025 Song ......................... H01Q 1/22
2025/0260152 A1 * 8/2025 Kim ..................... H01Q 1/1271
2025/0273860 A1 * 8/2025 Kwon .................... H01Q 5/307
2025/0372860 A1 * 12/2025 Odes ........................ B60R 11/02
2025/0372877 A1 * 12/2025 Odes .................... H01Q 1/1278
2025/0372887 A1 12/2025 Odes et al.

FOREIGN PATENT DOCUMENTS

JP 2011193381 A 9/2011
JP 2013026800 A 2/2013
WO WO-2014181564 A1 * 11/2014 ............. H01Q 5/357
WO 2024117114 A1 6/2024

OTHER PUBLICATIONS

German Office Action for German Application No. 102024121301.9; dated May 5, 2025; 11 pages.

* cited by examiner

ON GLASS SHORTED MONOPOLE ANTENNA DESIGN

INTRODUCTION

The subject disclosure relates to antennas used in vehicles, and in particular to an antenna assembly that can be implemented in a window that includes defrosting wires.

Vehicles include antennas for communication of various signals, such as radio signals, satellite signals, etc. As antenna size has decreased, the options for antenna placement have increased. Placing an antenna on a back window of a vehicle is however hindered by the presence of defroster wires, which take up a majority of the area of the back window. Accordingly, it is desirable to provide an antenna assembly that can be arranged to fit in, and operate within, a region of the back window not used by the defroster wires.

SUMMARY

In one exemplary embodiment, an antenna assembly suitable for use in a window of a vehicle is disclosed. The antenna assembly includes an antenna, a feedline and a ground line. The antenna has a first end and a second end opposite the first end. The antenna is disposed on a glass surface of the window with the first end intersecting a horizontal cover line of a metal frame of the window tangentially. The feed line connects to the first end of the antenna at the horizontal cover line to connect the antenna to a communication device. The ground line electrically couples the second end of the antenna to the metal frame.

In addition to one or more of the features described herein, the metal frame is on top of a part of the glass surface and is separated from the glass surface by a separation gap and the ground line is in the separation gap and a conductive adhesive layer in the separation gap electrically couples the ground line to the metal frame.

In addition to one or more of the features described herein, the conductive adhesive layer includes a urethane adhesive.

In addition to one or more of the features described herein, the ground line extends horizontally from the second end of the antenna to a vertical edge of the metal frame.

In addition to one or more of the features described herein, the ground line includes a first section extending horizontally from the second end of the antenna and a second section that electrically couples the first section to a top edge of the metal frame.

In addition to one or more of the features described herein, the ground line includes a third section extending horizontally from the second end of the antenna on an opposite side of the first section and a fourth section that electrically couples to the third section to the top edge of the metal frame.

In addition to one or more of the features described herein, the window is a back window including a set of defroster wires and the antenna is disposed within an antenna region between the set of defroster wires and a top edge of the metal frame.

In another exemplary embodiment, a window of a vehicle is disclosed. The window includes a glass surface, a metal frame around the glass surface, a set of defroster wires in the glass surface, wherein a top wire of the set of defroster wires is separated from a top edge of the metal frame by an antenna region, an antenna disposed in the antenna region, the antenna having a first end and a second end opposite the first end, wherein the first end intersects a horizontal cover line of the metal frame tangentially, a feed line that connects to the first end at the horizontal cover line, and a ground line that electrically couples the second end of the antenna to the metal frame.

In addition to one or more of the features described herein, the metal frame is on top of a part of the glass surface and is separated from the glass surface by a separation gap and the ground line is in the separation gap and a conductive adhesive layer in the separation gap electrically couples the ground line to the metal frame.

In addition to one or more of the features described herein, the conductive adhesive layer includes a urethane adhesive.

In addition to one or more of the features described herein, the ground line extends horizontally from the second end of the antenna to a vertical edge of the metal frame.

In addition to one or more of the features described herein, the ground line includes a first section extending horizontally from the second end of the antenna and a second section that electrically couples the first section to the top edge of the metal frame.

In addition to one or more of the features described herein, the ground line includes a third section extending horizontally from the second end of the antenna on an opposite side of the first section and a fourth section that electrically couples the third section to the top edge of the metal frame.

In addition to one or more of the features described herein, the window is a back window of the vehicle.

In yet another exemplary embodiment, a vehicle is disclosed. The vehicle includes a window having a glass surface, a metal frame around a perimeter of the window, the metal frame defining at least a horizontal cover line and a vertical cover line, wherein the metal frame is separated from the glass surface by a separation gap, a set of defroster wires in the glass surface, wherein a top wire of the set of defroster wires is separated from a top edge of the metal frame by an antenna region, an antenna disposed on the glass surface in the antenna region, the antenna having a first end and a second end opposite the first end, wherein the first end intersects the horizontal cover line of the metal frame tangentially, a feed line that connects to the first end of the antenna at the horizontal cover line, and a ground line that electrically couples the second end of the antenna to the metal frame.

In addition to one or more of the features described herein, the metal frame is on top of a part of the glass surface and is separated from the glass surface by a separation gap and the ground line is in the separation gap and a conductive adhesive layer in the separation gap electrically couples the ground line to the metal frame.

In addition to one or more of the features described herein, the conductive adhesive layer includes a urethane adhesive.

In addition to one or more of the features described herein, the ground line extends horizontally from the second end of the antenna to a vertical edge of the metal frame.

In addition to one or more of the features described herein, the ground line includes a first section extending horizontally from the second end of the antenna and a second section that electrically couples the first section to the top edge of the metal frame.

In addition to one or more of the features described herein, the ground line includes a third section extending horizontally from the second end of the antenna on an opposite side of the first section and a fourth section that electrically couples the third section to the top edge of the metal frame.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
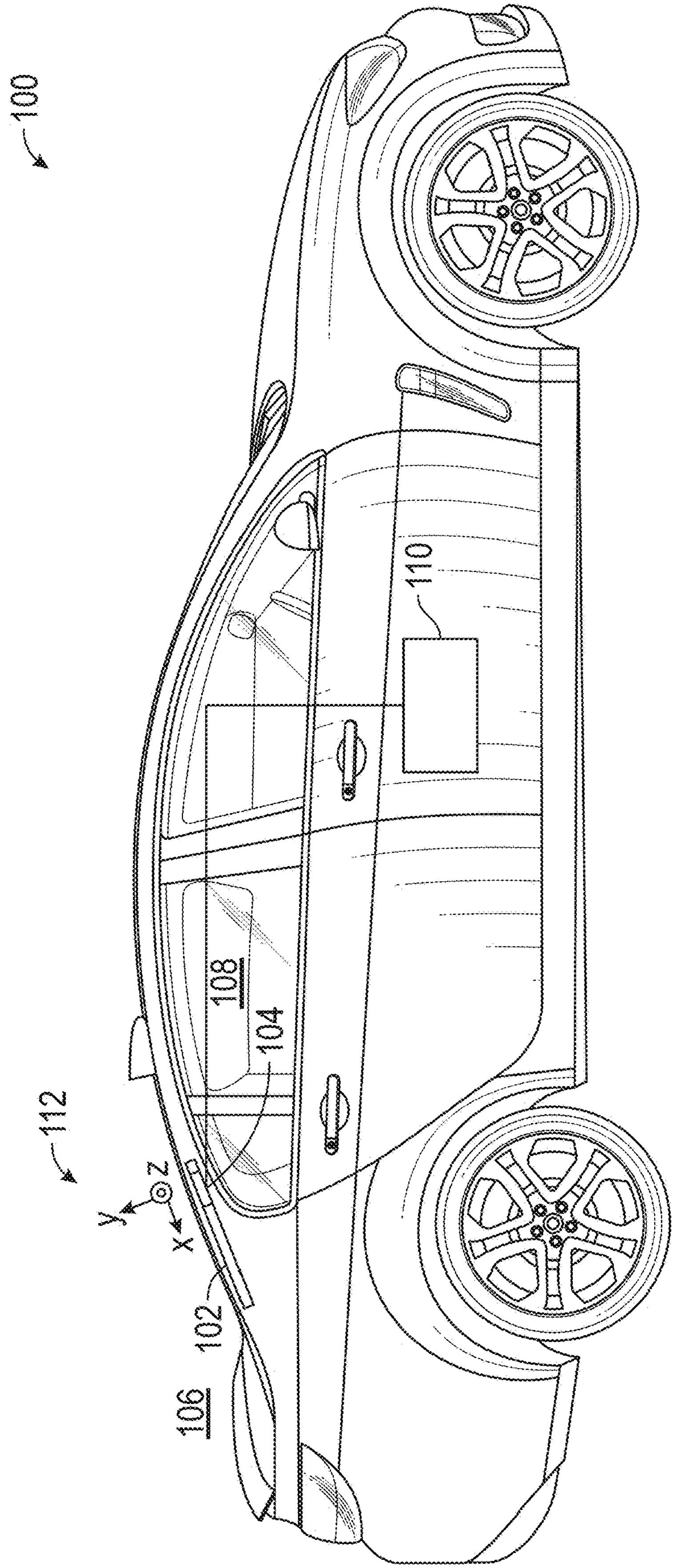
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100. The vehicle 100 includes a window 102 having an antenna assembly 104 embedded therein for communication purposes. The window 102 is shown as a back window of the vehicle 100 but, in various embodiments, can be any window of the vehicle. The window 102 separates the space around the vehicle 100 into an outer region 106 outside of the vehicle (i.e., behind the window 102) and an inner region 108 inside of the vehicle (i.e., in front of the window). A coordinate system 112 is shown for the antenna assembly 104. The x-axis and z-axis define a plane of the window 102 and of the antenna assembly 104. Movement or placement of an object along the x-axis is indicated using the terms "left" and "right", while movement or placement of an object along the z-axis is indicated using the terms "top" and "bottom". The y-axis is directed out of the plane of the window 102 and into the outer region 106. A placement of a first object "on top of" a second object is indicated by the first object being at a more positive location along the y-axis as the second object.

The antenna assembly 104 is coupled to a communication device 110, such as a Global Positioning Satellite (GPS) or a Global Navigation Satellite System (GNSS) receiver, for example. In various embodiments, the antenna assembly 104 is capable of communicating over a range between 600 Megahertz (MHz) and 6 Gigahertz (GHz).

Figure 2:
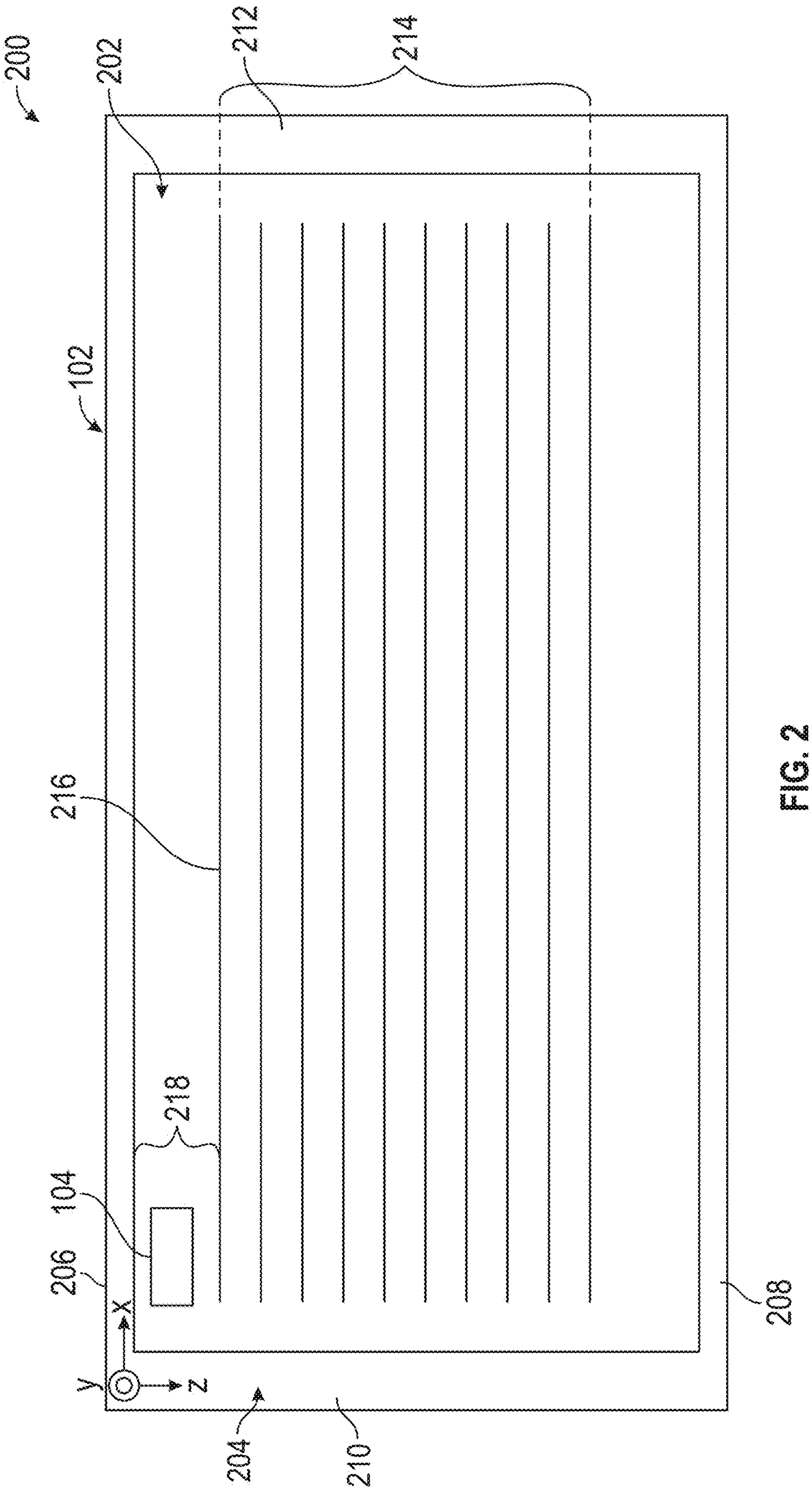
FIG. 2 shows a view of the window of the vehicle as seen along the y-axis, in an embodiment.

FIG. 2 shows a view 200 of the window 102 of the vehicle as seen along the y-axis, in an embodiment. The window 102 includes a glass surface 202 and a metal frame 204 that secures the glass surface 202 to the vehicle. The metal frame 204 is located at a perimeter of the glass surface 202 and includes a top edge 206, a bottom edge 208, a left edge 210 and a right edge 212. Each of the top edge 206 and the bottom edge 208 form a horizontal edge of the window 102, while each of the left edge 210 and right edge 212 form a vertical edge of the window. Although not shown, the edges of the glass surface 202 can extend underneath respective edges of the metal frame 204. A set of defroster wires 214 fills an area of the window 102. A top wire 216 of the set of defroster wires 214 is separated from the top edge 206 of the metal frame 204 by an antenna region 218. The antenna assembly 104 is disposed in the antenna region 218 in a top left corner of the window 102 (i.e., a corner defined by the intersection of the top edge 206 and the left edge 210). The glass surface 202, the antenna assembly 104 and the metal frame 204 are located in different layers along the y-axis, as discussed herein with respect to FIG. 4.

Figure 3A:
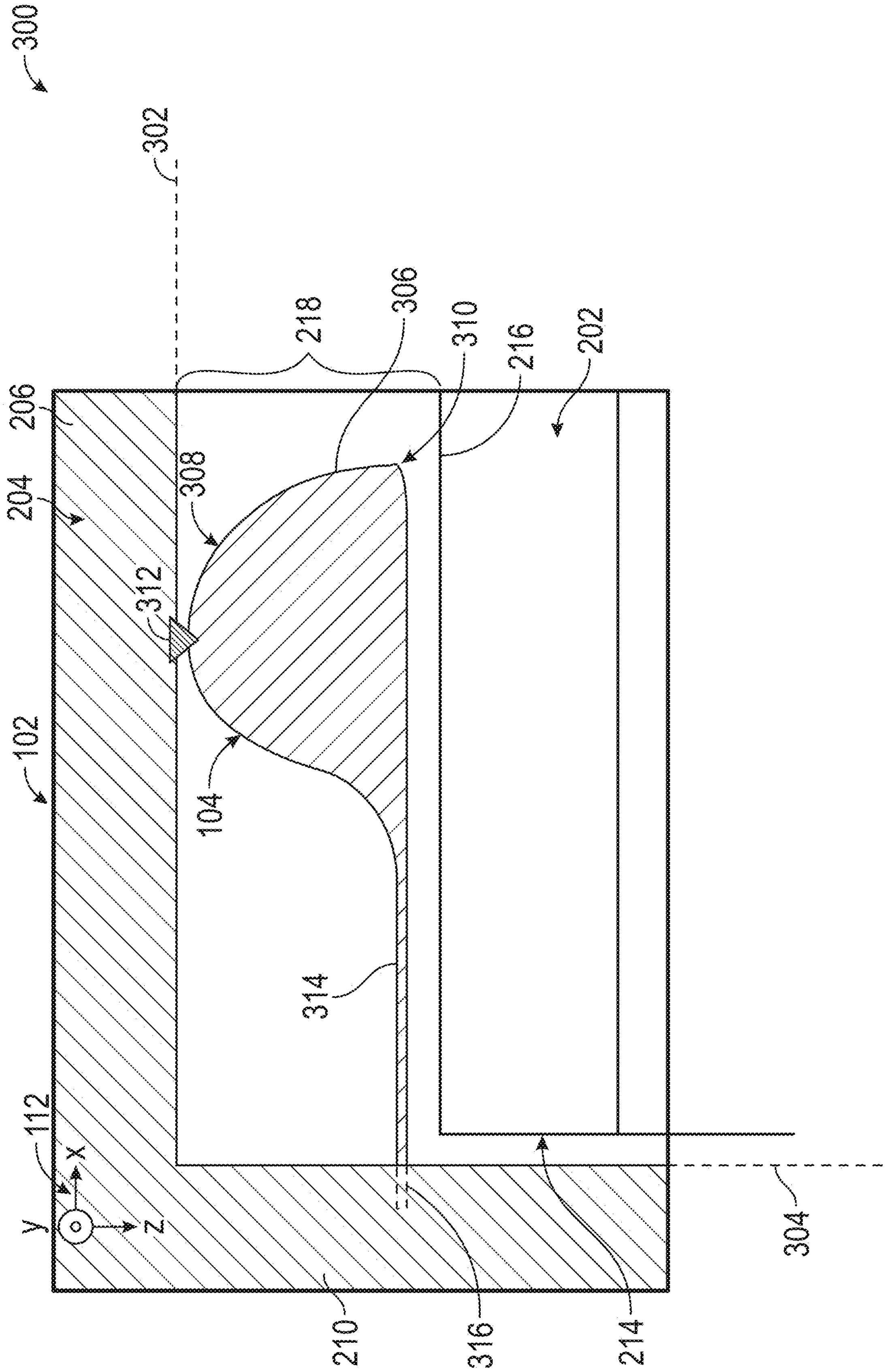
FIG. 3A shows a close-up view of the top left corner of the window, in an illustrative embodiment.

FIG. 3A shows a close-up view 300 of the top left corner of the window 102, in an illustrative embodiment. The close-up view 300 shows the top edge 206 and left edge 210 of the metal frame 204. A horizontal cover line 302 defines a separation between a part of the window which is visible from a part of the window that is hidden underneath the top edge 206. A vertical cover line 304 which defines a separation between a part of the window which is visible from a part of the window that is hidden underneath the left edge 210.

The antenna assembly 104 includes a monopole antenna 306 disposed in the top left corner on an outer surface of the window 102 and within the antenna region 218. The monopole antenna 306 includes a first end 308 and a second end 310 opposite the first end. The first end 308 is arranged proximal to the top edge 206 and the second end 310 is arranged distal from the top edge. The first end 308 can include a rounded or curved contour line that intersects the horizontal cover line 302 tangentially. A feed line 312 connects to the first end of the monopole antenna 306 at the horizontal cover line 302. The feed line 312 connects the monopole antenna 306 to the communication device 110 (FIG. 1) so that an RF signal can be transmitted and/or received.

The second end 310 of the monopole antenna 306 is located near the top wire 216 of the set of defroster wires 214. A ground line 314 extends from the second end 310 in a horizontal line towards the left edge 210 of the metal frame 204 (i.e., parallel to the top wire 216). The ground line 314 crosses through the vertical cover line 304 so that a ground segment 316 of the ground line lies between the metal frame 204 and the glass surface 202, as shown in FIG. 4.

Figure 3B:
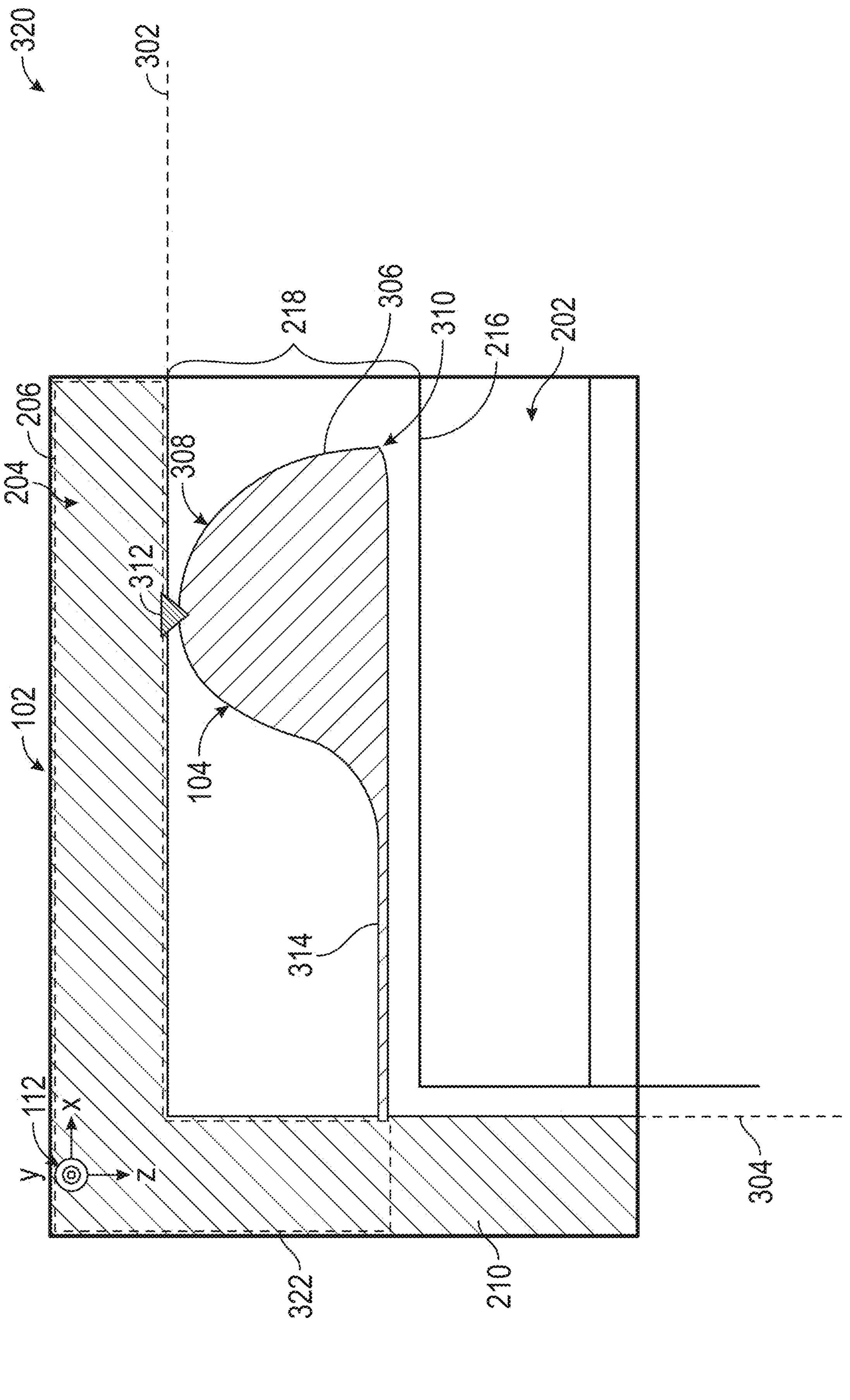
FIG. 3B shows a close-up view of the top left corner of the window, in an alternative embodiment.

FIG. 3B shows a close-up view 320 of the top left corner of the window 102, in an alternative embodiment. The ground line 314 extends from the second end 310 in a horizontal line towards the left edge 210 of the metal frame 204. The ground line 314 crosses through the vertical cover line 304 to form a ground plane 322. The outline shape of the ground plane 322 conforms to a shape of the top left corner of the metal frame 204, including a portion of the top edge 206 and a portion of the left edge 210. The ground plane 322 lies between the metal frame 204 and the glass surface 202, as shown in FIG. 4.

Figure 4:
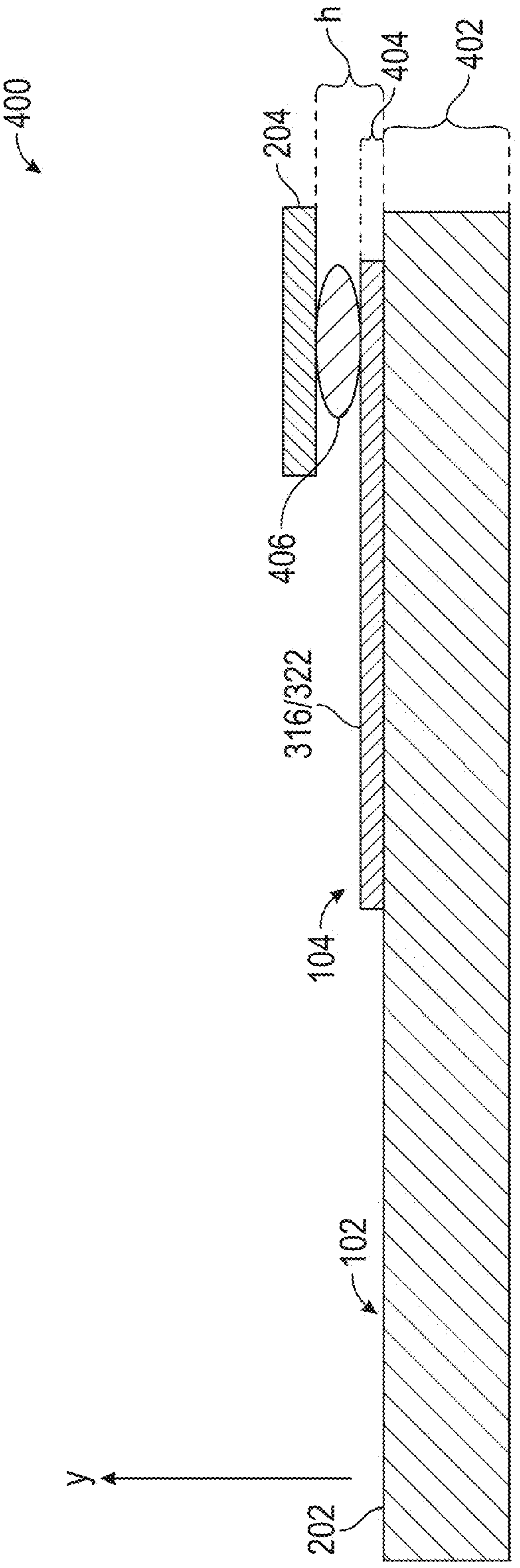
FIG. 4 shows a side view of the window and antenna assembly, in an illustrative embodiment.

FIG. 4 shows a side view 400 of the window 102 and antenna assembly 104, in an illustrative embodiment. The y-axis is shown with respect to the window 102. The side view 400 shows a glass layer 402 that includes the glass surface 202, an antenna layer 404 that includes the antenna assembly 104, a conductive adhesive layer 406, and the metal frame 204. The metal frame 204 on top of the glass surface 202 and separated from the glass surface by a separation gap h. In various embodiments, the separation gap h is about 6 millimeters. The ground segment 316 of the antenna assembly 104 is disposed on the glass surface 202 and lies within the separation gap h. The conductive adhesive layer 406 is disposed in the separation gap h to secure the ground segment 316 to the metal frame 204. The conductive adhesive layer 406 electrically couples the ground segment 316 to the metal frame 204, thereby grounding the monopole antenna 306. In various embodiments, the conductive adhesive layer 406 includes a urethane adhesive. While FIG. 4 is discussed with respect to the ground segment 316 of FIG. 3A, in an alternative embodiment, the ground plane 322 can be disposed in the separation gap h and adhered to the metal frame 204 via the conductive adhesive layer 406.

Figure 5A:
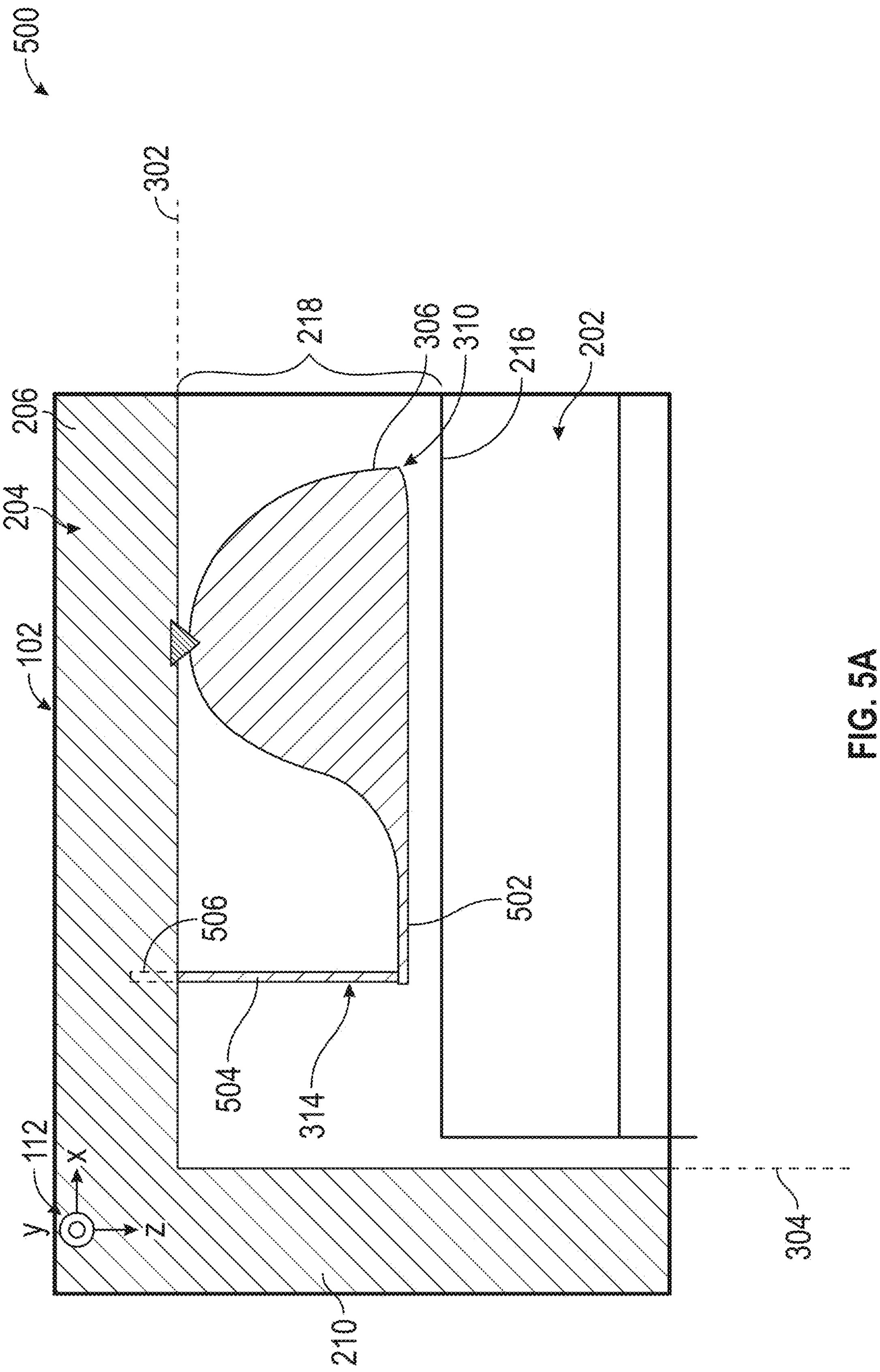
FIG. 5A shows a top view of the top left corner of the window, in an alternative embodiment.

FIG. 5A shows a top view 500 of the top left corner of the window 102, in an alternative embodiment. The monopole antenna 306 is disposed on the outer surface of the glass surface 202 within the antenna region 218 with the rounded contour line of the first end 308 intersecting the horizontal cover line 302 tangentially. The feed line 312 connects to the first end 308 at the horizontal cover line 302.

At the second end 310 of the monopole antenna 306, a first section 502 of ground line 314 extends along a horizontal line toward the left edge 210 of the metal frame 204. A second section 504 connects the first section 502 to the metal frame 204 at the top edge 206. A ground segment 506 of the second section 504 crosses through the horizontal cover line 302 to lie between the metal frame 204 and the glass surface 202. As illustrated in FIG. 4, the ground segment 506 is electrically coupled to the metal frame 204 via the conductive adhesive layer 406.

Figure 5B:
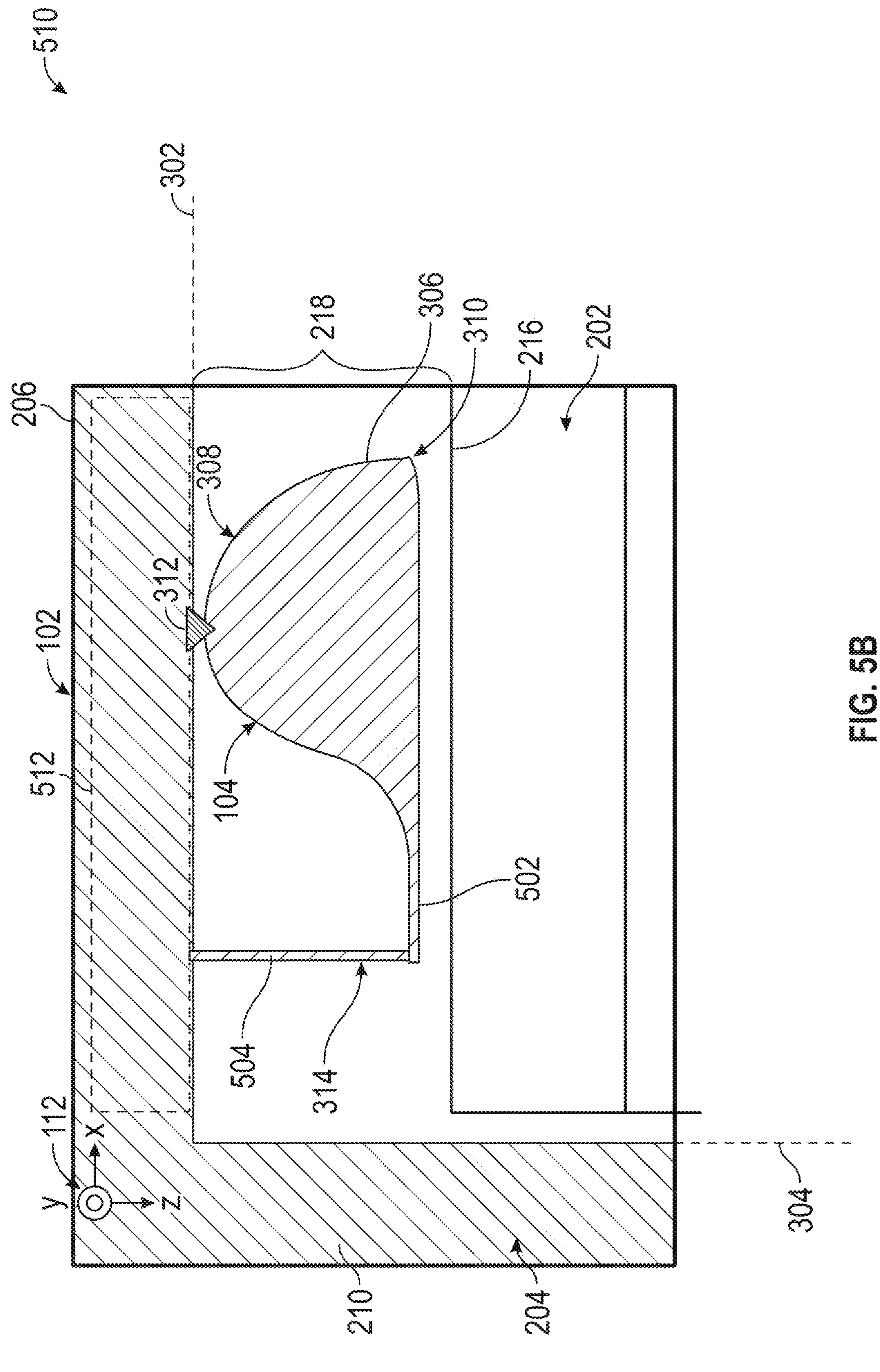
FIG. 5B shows a top view of the top left corner of the window, in an alternative embodiment.

FIG. 5B shows a top view 510 of the top left corner of the window 102, in an alternative embodiment. The second section 504 crosses through the horizontal cover line 302 and forms a ground plane 522 that lies between the top edge 206 of the metal frame 204 and the glass surface 202. The ground plane 522 is electrically coupled to the metal frame 204 via the conductive adhesive layer 406.

Figure 6A:
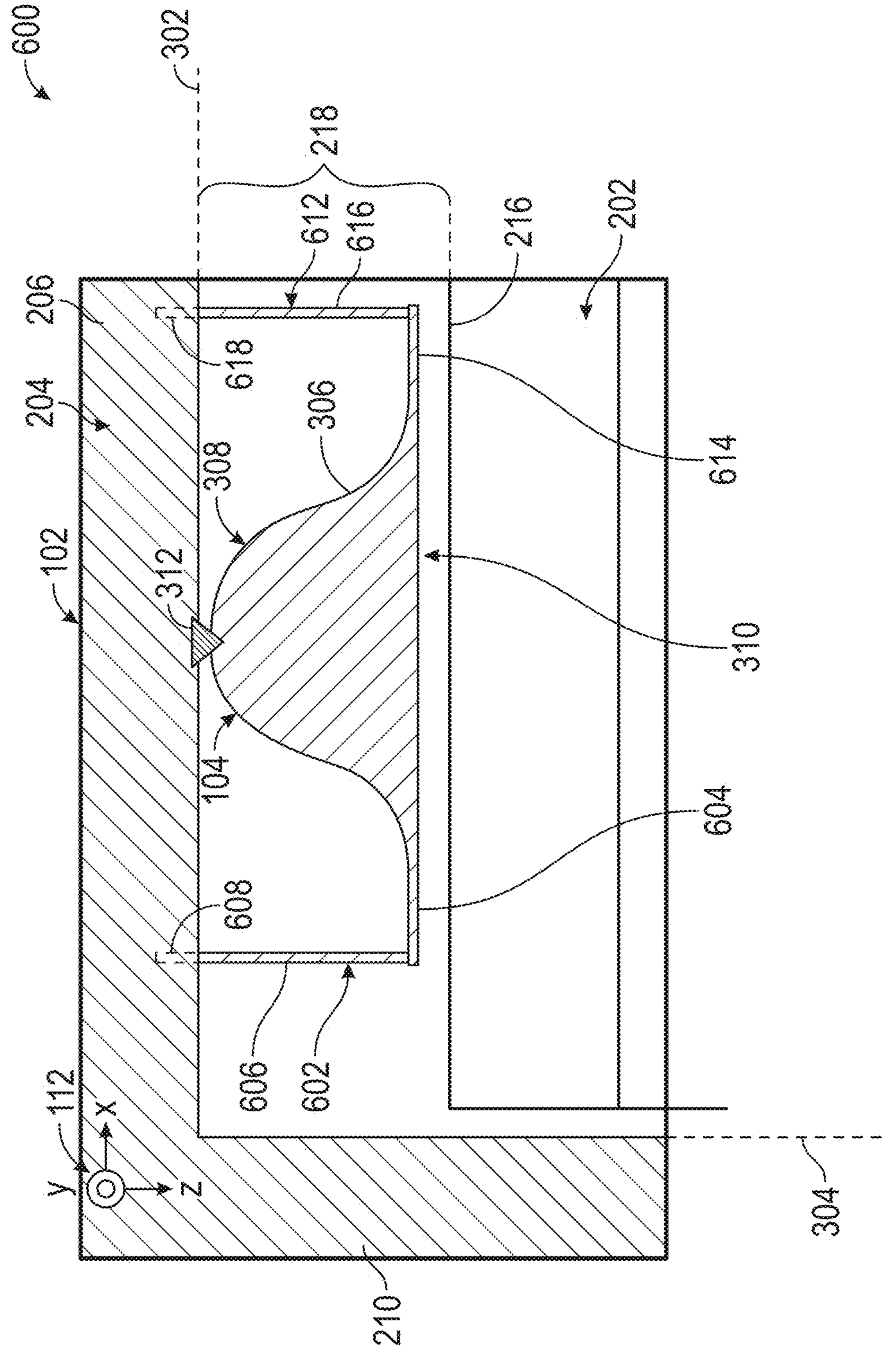
FIG. 6A shows a top view of the top left corner of the window, in another alternative embodiment.

FIG. 6A shows a top view 600 of the top left corner of the window 102, in another alternative embodiment. The monopole antenna 306 is disposed on the outer surface of the glass surface 202 within the antenna region 218 with the rounded contour line of the first end 308 intersecting the horizontal cover line 302 tangentially. The feed line 312 connects to the first end 308 at the horizontal cover line 302.

A first ground line 602 extends from the second end 310 of the monopole antenna 306. The first ground line 602 includes a first section 604 and a second section 606. The first section 604 extends from the second end 310 horizontally toward the left edge 210 of the metal frame 204. The second section 606 is a vertical section that connects the first section 604 to the top edge 206 of the metal frame 204. The second section 606 includes a ground segment 608 that crosses through the horizontal cover line 302 to lie between the top edge 206 and the glass surface 202. The ground segment 608 electrically couples to the metal frame 204 as illustrated in FIG. 4.

A second ground line 612 extends from the second end 310 of the monopole antenna 306. The second ground line 612 includes a third section 614 and a fourth section 616. The third section 614 extends horizontally from the second end 310 in a direction away from the left edge 210. The fourth section 616 is a vertical section that connects the third section 614 to the top edge 206. The fourth section 616 includes a ground segment 618 that extends past the metal frame 204 to lie between the top edge 206 and the glass surface 202. The ground segment 608 electrically couples to the metal frame as shown in FIG. 4.

Figure 6B:
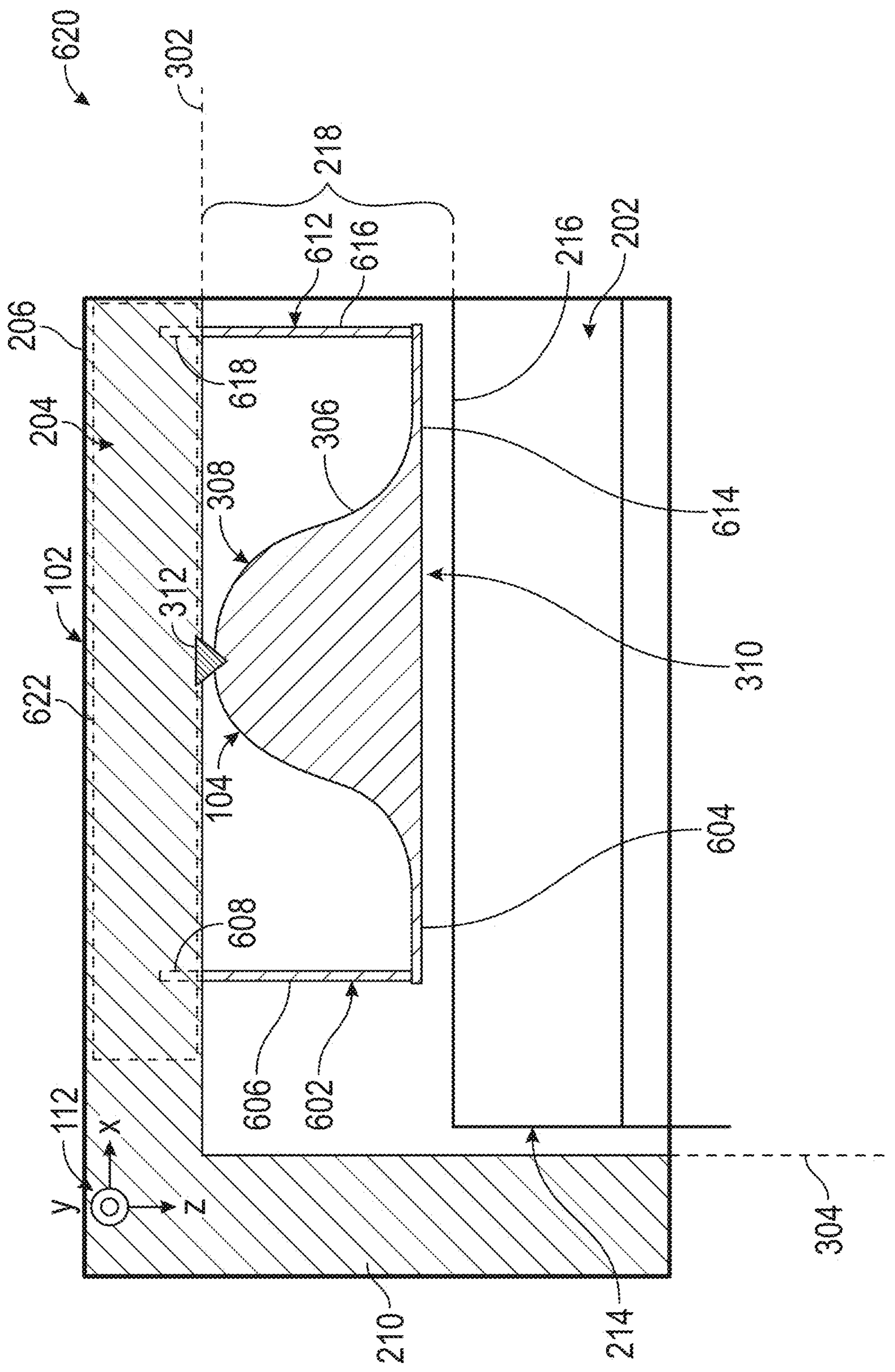
FIG. 6B shows a top view of the top left corner of the window, in another alternative embodiment.

FIG. 6B shows a top view 620 of the top left corner of the window 102, in another alternative embodiment. The second section 606 of the first ground line 602 crosses through the horizontal cover line 302 of the top edge 206 to form a ground plane 622 that lies between the top edge 206 and the glass surface 202. Similarly, the fourth section 616 of the second ground line 612 crosses through the horizontal cover line 302 of the top edge 206 and into the ground plane 622. The ground plane 622 is electrically coupled to the metal frame 204 via the conductive adhesive layer 406.

The ground line(s) are arranged to avoid intersection with any of the defroster wires, thereby avoiding or preventing any interference from the defroster wires. In addition, the presence of the ground line(s) at the second end of the monopole antenna 306 allows for the size and area of the antenna to be reduced. While the antenna assembly is discussed as being located in a top left corner of the window, it is understood that the antenna assembly can be located at other suitable locations, such as, but not limited to, a top right corner, a bottom left corner, and a bottom right corner.

Figure 7:
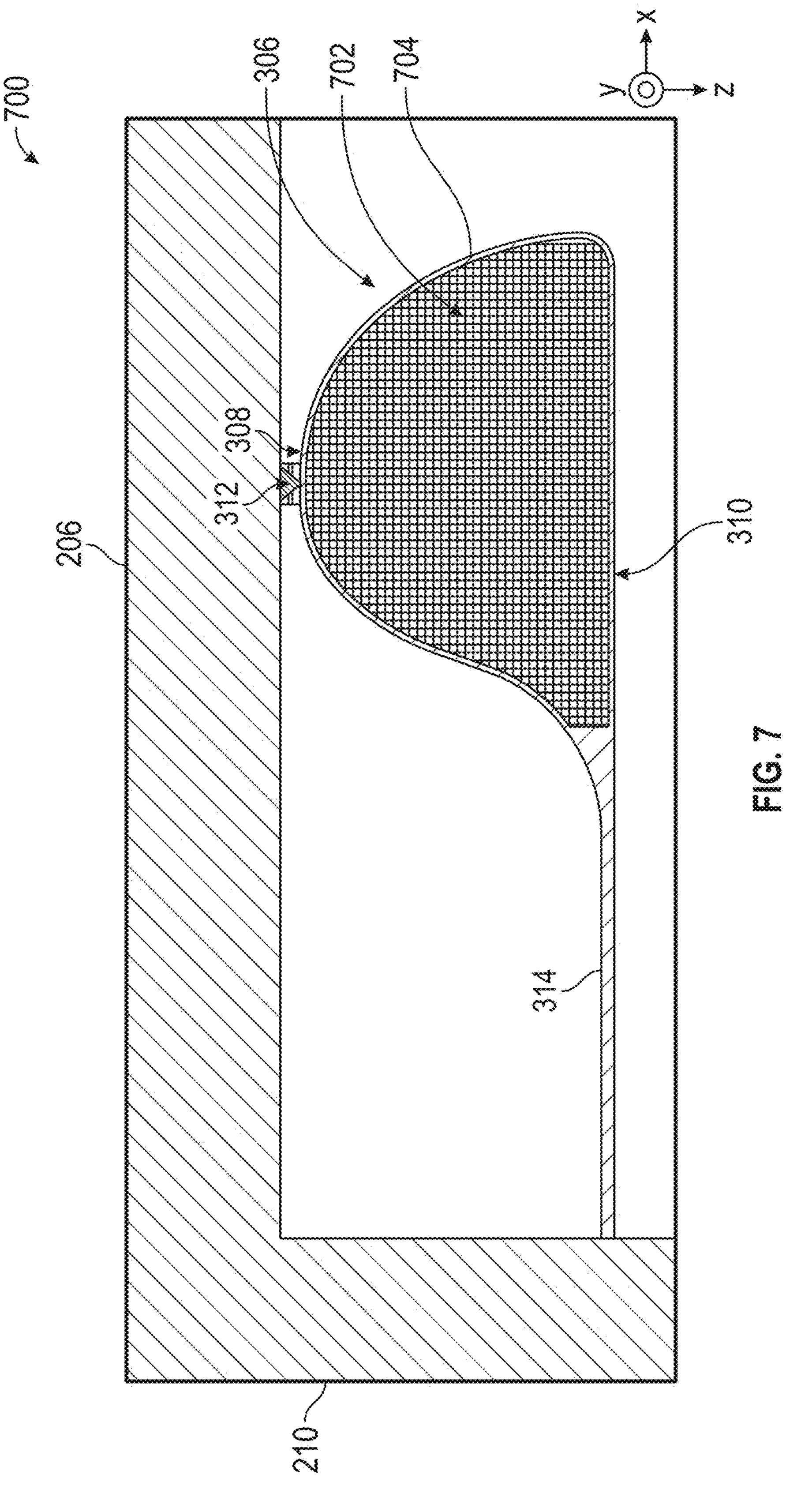
FIG. 7 shows a closeup view of the monopole antenna of FIGS. 3A and 3B, in an illustrative embodiment.

FIG. 7 shows a closeup view 700 of the monopole antenna 306 of FIGS. 3A and 3B, in an illustrative embodiment. The monopole antenna 306 includes a mesh 702 of electrical wires surrounded by an edge 704 that frames the mesh. The edge 704 is made of wires that are thicker than the electrical wires of the mesh 702. The monopole antenna extends from the first end 308 to the second end 310. The feed line 312 is shown at the first end 308 and the ground line 314 is shown extending from the second end 310 in a horizontal line towards the left edge 210. While the ground line 314 is shown as a solid material, in various embodiments, the ground line can include a mesh structure such as shown by mesh 702. Similar construction can be made for the monopole antennas of FIGS. 5A, 5B, 6A and 6B.

While the antenna assembly has been described herein as including a monopole antenna, it is to be understood that the antenna assembly can include any type of antenna, such as a dipole antenna, a quadrupole antenna, etc. The antenna assemblies can be formed on the glass surface 202 using various methods. In one method, the antenna is printed onto a transparent filament, or applique, that has an adhesive on one side to attach to the glass surface 202. In another embodiment, the antenna is printed on the glass itself.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An antenna assembly suitable for use in a window of a vehicle, comprising:

an antenna having a first end and a second end opposite the first end, the antenna disposed on a glass surface of the window;

a feed line that connects to the first end of the antenna at a horizontal cover line of a metal frame of the window, wherein the feed line connects the antenna to a communication device; and a ground line that electrically couples the second end of the antenna to the metal frame, wherein the ground line extends horizontally from the second end of the antenna to a vertical edge of the metal frame.

2. The antenna assembly of claim 1, wherein the metal frame is on top of a part of the glass surface and is separated from the glass surface by a separation gap and the ground line is in the separation gap, further comprising a conductive adhesive layer in the separation gap that electrically couples the ground line to the metal frame.

3. The antenna assembly of claim 2, wherein the conductive adhesive layer includes a urethane adhesive.

4. The antenna assembly of claim 1, wherein the window is a back window including a set of defroster wires and the antenna is disposed within an antenna region between the set of defroster wires and a top edge of the metal frame.

5. A window of a vehicle, comprising:

a glass surface;

a metal frame around the glass surface;

a set of defroster wires in the glass surface, wherein a top wire of the set of defroster wires is separated from a top edge of the metal frame by an antenna region;

an antenna disposed in the antenna region, the antenna having a first end and a second end opposite the first end;

a feed line that connects to the first end at a horizontal cover line of the metal frame; and a ground line that electrically couples the second end of the antenna to the metal frame, wherein the ground line extends horizontally from the second end of the antenna to a vertical edge of the metal frame.

6. The window of claim 5, wherein the metal frame is on top of a part of the glass surface and is separated from the glass surface by a separation gap and the ground line is in the separation gap, further comprising a conductive adhesive layer in the separation gap that electrically couples the ground line to the metal frame.

7. The window of claim 6, wherein the conductive adhesive layer includes a urethane adhesive.

8. The window of claim 5, wherein the window is a back window of the vehicle.

9. A vehicle, comprising:

a window of the vehicle having a glass surface;

a metal frame around a perimeter of the window, the metal frame defining at least a horizontal cover line and a vertical cover line, wherein the metal frame is separated from the glass surface by a separation gap;

a set of defroster wires in the glass surface, wherein a top wire of the set of defroster wires is separated from a top edge of the metal frame by an antenna region;

an antenna disposed on the glass surface in the antenna region, the antenna having a first end and a second end opposite the first end;

a feed line that connects to the first end of the antenna at the horizontal cover line; and a ground line that electrically couples the second end of the antenna to the metal frame, wherein the ground line extends horizontally from the second end of the antenna to a vertical edge of the metal frame.

10. The vehicle of claim 9, wherein the metal frame is on top of a part of the glass surface and is separated from the glass surface by a separation gap and the ground line is in the separation gap, further comprising a conductive adhesive layer in the separation gap that electrically couples the ground line to the metal frame.

11. The vehicle of claim 10, wherein the conductive adhesive layer includes a urethane adhesive.

12. The antenna assembly of claim 1, wherein the first end defines a rounded or curved contour line.

13. The window of claim 5, wherein the first end defines a rounded or curved contour line.

14. The vehicle of claim 9, wherein the first end defines a rounded or curved contour line.

15. The antenna assembly of claim 1, wherein the antenna includes a mesh of electrical wires surrounded by an edge that frames the mesh.

16. The antenna assembly of claim 15, wherein the edge is made of wires that are thicker than the electrical wires of the mesh.

17. The window of claim 5, wherein the antenna includes a mesh of electrical wires surrounded by an edge that frames the mesh.

18. The window of claim 17, wherein the edge is made of wires that are thicker than the electrical wires of the mesh.

19. The vehicle of claim 9, wherein the antenna includes a mesh of electrical wires surrounded by an edge that frames the mesh.

20. The vehicle of claim 19, wherein the edge is made of wires that are thicker than the electrical wires of the mesh.

* * * * *